Feb. 28, 1939.    A. G. S. SANDISON    2,148,584
ELECTRICAL MEASURING SYSTEM
Filed Sept. 7, 1935
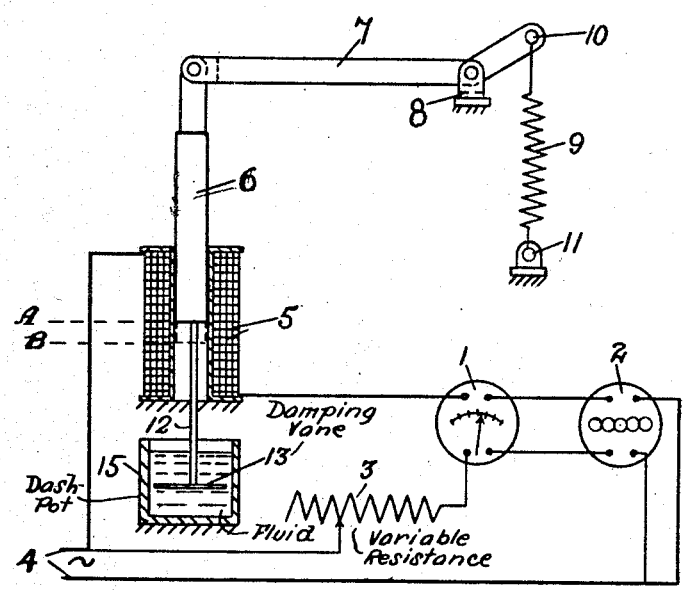
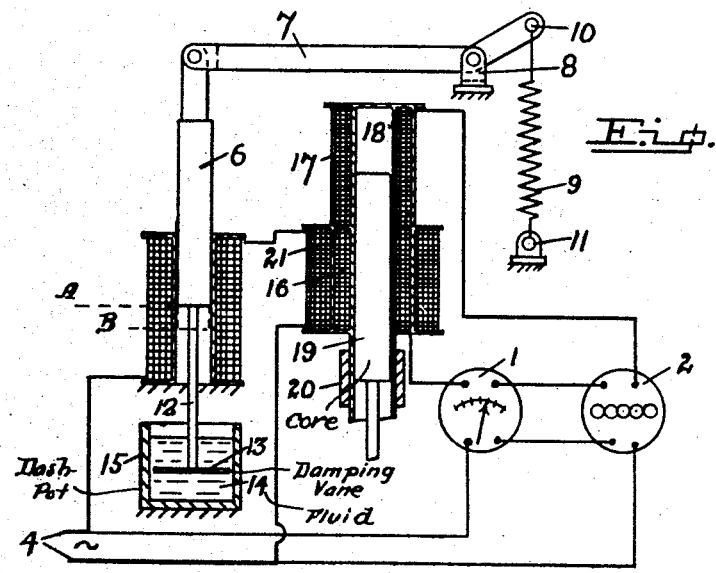
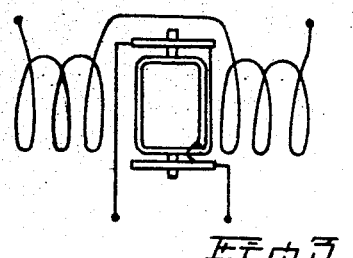
Inventor.
A.G.S. Sandison.
By
William E. P. Bayly
His Attorney.

Patented Feb. 28, 1939

2,148,584

UNITED STATES PATENT OFFICE 2,148,584

ELECTRICAL MEASURING SYSTEM

Alexander Greswolde Seymour Sandison,
West Wickham, England

Application September 7, 1935, Serial No. 39,620
In Great Britain September 17, 1934

3 Claims. (Cl. 171—95)

This invention relates to electrical systems for indicating, recording and/or integrating the values of physical quantities. It is well known to employ electrical instruments for indicating, recording and/or integrating the values of physical quantities by connecting such instruments in a circuit which, by suitable inductive, resistance varying, or other means is influenced by the value of the physical quantities. There is, however, the objection that instruments so connected may be influenced also by variations in the supply voltage applied to the circuit unless some provision is made to eliminate the influence of these variations. A provision that has sometimes been made is to use "voltage-controlled" instruments of a construction such that their control forces, as well as their deflecting force, vary on variation of the supply voltage. Such instruments, however, are generally of a somewhat elaborate construction. Another provision that has sometimes been made is to regulate the voltage applied to the circuit to a steady value, but this in many cases involves the use of relatively complicated apparatus.

It has also been proposed to arrange for an electrical instrument to be responsive to the sum of two super-imposed electric currents, the one current being allowed to vary in proportion to the voltage and also being arranged to be influenced by the value of the physical quantity, and the other or compensating current being independently regulated to decrease on increase of voltage or vice versa.

When alternating current is used, the most satisfactory type of electrical instruments to employ are generally those of the watt-meter type, whose readings vary as the product of the currents in two instrument coils or sets of instrument coils connected in separate circuits, as instruments of this type have the advantage that they are readily constructed to have a scale evenly divided in terms of the product of the currents, and are also available in the integrating or watt-hour type. When this type of instrument is employed it is, of course, possible to regulate the voltage applied to both circuits to a steady value, but this usually involves regulating the voltage on circuits of which at least one has its current influenced by the physical quantity, so that a relatively elaborate voltage regulating device as distinct from a current regulating device must be employed. In any case, the voltage regulation apparatus must obviously be of a larger capacity than would be necessary if one circuit only were regulated.

According to the present invention, electrical instruments are employed whose readings vary as the product of the currents in two circuits, the current in one circuit being allowed to vary in proportion to the applied voltage and that in the other circuit being regulated in substantially inverse proportion to the applied voltage, the current in one circuit also being influenced by the value of the physical quantity.

It is preferred to regulate the current inversely in proportion to the supply voltage by means of a solenoid connected in the appropriate one of the circuits and having a movable core, the core being so located and supported that on increase in voltage it is pulled downward into the solenoid to increase the impedance thereof to an extent sufficient to decrease the current therethrough substantially in proportion to the increase in the voltage.

If one set of instrument coils is connected in a circuit directly in series with a variable resistance or impedance controlled according to the value of the physical quantity without the use of any shunt or auxiliary circuit, the means regulating the current inversely in proportion to the applied voltage should be connected in the circuit of the other set of instrument coils.

If, however, one set of instrument coils is connected in an auxiliary or a shunt circuit which is variably coupled with the main circuit by means controlled according to the value of the physical quantity, then the means for regulating the current inversely in proportion to the applied voltage may be connected either in the main circuit or in the circuit of the other set of instrument coils.

The invention will now be described with reference to the accompanying drawings, in which:

Fig. 1 is a diagram illustrating the operation of the invention with an electrical system in which a variable resistance or impedance controlled according to the value of a physical quantity is connected directly in circuit with a set of instrument coils.

Fig. 2 is a diagram illustrating the operation of the invention with an electrical system in which variable coupling means controlled according to the value of a physical quantity inductively couples a main circuit with a branch circuit, which includes a set of instrument coils.

Fig. 3 is an enlarged interior view of the coil arrangement of a moving coil wattmeter.

Referring now to Fig. 1, indicating and integrating electrical instruments 1 and 2 of the watt-meter type, for example, a moving coil instrument as shown in Fig. 3, have one set of coils connected through a variable resistance or impedance 3 across the alternating current supply leads 4. The other set of coils of the instruments 1 and 2 are connected through a fixed solenoid 5 across the alternating current supply leads 4. The solenoid 5 has a core 6 suspended from one end of a beam 7 pivotally held by the fixed bracket 8. A tension spring 9 has its one end secured to a pin 10 on the opposite end of the beam 7 and its other end to a fixed pin 11. The core 6 has secured to it a rod 12 carrying a damping vane 13 immersed in damping fluid 14 contained in a dash-pot 15 for the purpose of damping out the oscillations of the core 6.

Referring now to Fig. 2 the indicating and integrating instruments 1 and 2 of the watt-meter type have one set of coils connected directly across the alternating current supply leads 4 and the other set of coils of the instruments 1 and 2 are connected to form a circuit with the coils 16 and 17 which are carried on a tube 18 within which is a movable magnetic core 19. The coils 16 and 17 are oppositely wound and the coil 17 has a larger number of turns than the coil 16. The coil 16 is located near the middle portion and the coil 17 near one end of the core 19 when the latter is in its usual working positions. A short circuited ring or winding 20 is located near the other end of the core 19. A further winding 21 located substantially at the same distance as the coil 16 along the length of the core 19 is connected in series with the solenoid 5 which has a core 6 and mechanism associated therewith as previously described with reference to Fig. 1.

The impedance 3 is operated by means responsive to the physical quantity whose value it is required to measure, for example, if fluid pressure is being measured it may be operated by a Bourdon tube or a diaphragm responsive to the pressure, devices in which the variable impedance is so operated being well known.

The core 19 is operated by means responsive to the physical quantity whose value it is required to measure, for example, if fluid pressure is being measured, it may be operated by a Bourdon tube or diaphragm responsive to the pressure, such devices being well known.

The short circuited ring or winding 20 is for the purpose of maintaining the impedance of the core 21 substantially constant for all positions of the core 19 as hereinafter explained.

Referring now to either figure, the function of the solenoid 5, core 6, and the mechanism associated therewith is to regulate the value of the current in the circuit containing the solenoid in substantially inverse relationship to the voltage applied to the circuit for the range of voltage variation liable to occur. The adjustment of the mechanism to give the correct regulation is preferably made by a process of trial and error, but that this relationship may be obtained without involving instability of action will be apparent from the following considerations:

It is well known that as a magnetic core is moved into a solenoid, the electro-magnetic force exerted on it for any fixed value of the current in the solenoid at first increases, then is fairly constant at a maximum value and then decreases as the middle portion of the core approaches the middle portion of the solenoid. It is here assumed that the mean operating position of the core is chosen at this maximum position so that the electro-magnetic force exerted on the core for a given solenoid current is substantially constant for any operating position. At the same time the impedance of the solenoid will increase continuously as the core is moved into the solenoid. It is also assumed that the flux density in the core is considerably below the saturation value so that the force exerted on the core by the solenoid increases substantially as the square of the current.

It will further be assumed that when the core is in a given position, say position A in its operating range, the electro-magnetic force exerted on it by the solenoid when a current of 1 ampere is passing therethrough is 1 lb., and that with the core in this position the impedance of the solenoid circuit is 100 ohms. If the core is moved to a second position B near the middle of the solenoid such that the impedance of the solenoid is 102 ohms the force exerted for a current of 1 ampere will still be closely 1 lb. Now it will be assumed that the couple exerted around the pivot of the beam 7 by the tension spring 9 is sufficient to support the weight of the core plus 1 lb., in position A but only to support the weight of the core plus 0.98 lb., in position B. This characteristic may be secured by arranging for the angle between the lines adjoining the operating centres 8—10 and 10—11 to be acute.

Now if the voltage applied to the solenoid circuit is 100 volts, then in position A the core is evidently in equilibrium, as the circuit impedance is 100 ohms, so that a current of 1 ampere passes through the solenoid and a downward force of 1 lb. is exerted on the core balancing the upward force of 1 lb. exerted on it in this position by the action of the spring 9. If the core were displaced to position B while the applied voltage is still 100 volts, the current through the corresponding circuit impedance of 102 ohms would be approximately 0.98 ampere and the solenoid would now exert a force of approximately 0.96 lb. downward on the core. The upward force exerted by the action of the spring 9 is now 0.98 lb., and thus is greater than the downward force of 0.96 lb. so that the core would tend to move back to position A. These considerations will show that when the applied voltage is 100 the core is in stable equilibrium in position A, maintaining the impedance of the solenoid circuit at 100 ohms and the current in the circuit at 1 ampere.

Now if the voltage applied to the solenoid is 101 volts, then it is evident that in position A, in which position the impedance of the solenoid is 100 ohms, the current in the solenoid would be 1.01 amps., so that it would exert on the core a downward force of approximately 1.02 lbs., and as this force is greater than the upward force of 1 lb., exerted by the spring there is an unbalanced form of .02 lb., causing the core to move downward. As the core moves downward the upward force exerted by the spring decreases, but the impedance of the solenoid circuit increases, so that the current in that circuit decreases, and as the downward force exerted by the solenoid varies as the square of the current therethrough the downward force also decreases, and, provided that the rate of decrease of the downward force is greater than that of the upward force, the core will reach a new position of equilibrium when it has moved downward a certain distance. In the example considered this new equilibrium position, when the voltage applied to the solenoid is 101 volts, will be in position B, for in this position (or, if quantities of the second order are considered, in a position very close thereto) the core is evidently in equilibrium as the circuit impedance is 102 ohms so that a current of approximately 0.99 ampere passes through the solenoid and exerts a downward force of approximately 0.98 lb. which balances the upward force of 0.98 lb. exerted on it in this position by the action of the spring 9. If the core were to be displaced to position A while the applied voltage is still 101 volts, then the current through the corresponding circuit impedance of 100 ohms would be 1.01 amperes and the solenoid would now exert a downward force of approximately 1.02 lbs. on the core. The upward force exerted by the action of the spring 9 is now 1 lb., and thus less than the electro-magnetic force of 1.02 lbs. so that the core would tend to move back to position B. These considerations show that when the applied voltage is 101 the core is in stable equilibrium in position B maintaining the impedance of the solenoid circuit at 102 ohms and the current in the circuit at approximately 0.99 ampere.

It is thus seen that the solenoid and its associated mechanism can be adjusted so as to regulate the current in the circuit of the solenoid in substantially inverse relationship with the changes of voltage applied to the circuit, over the range of variation of voltage which is likely to be encountered in practice. The purpose of the vane 13, dash-pot 15, and damping fluid 14 is to damp out any oscillating or over-shooting action.

Referring now to Fig. 1, the variable impedance 3 is operated by means responsive to the value of the physical quantity. The present invention is not concerned with the means employed for operating the impedance, and many well known means are available. If, in particular, the value of the impedance 3 is so regulated that the impedance of the circuit containing it maintains an inverse relationship to the value of the physical quantity, then it is evident that the current therethrough will be proportional to the product of the value of the physical quantity and the value of the applied voltage. Thus, as the instruments 1 and 2 are responsive to the product of this current and the current through the solenoid 5, which latter current is regulated in substantially inverse proportion to variations of the applied voltage, it is evident that the instruments are responsive to the value of the physical quantity but are substantialy unaffected by the variation in the supply voltage.

Referring now to Fig. 2, the core 19 is operated by suitable means responsive to the value of the physical quantity. The coil 21 acts as a magnetizing winding and the coils 16 and 17 as a secondary winding. As the coil 16 has a lesser number of turns than the coil 17, it is evident that for a certain position of the core 19 the E. M. F.'s induced in coils 16 and 17 are equal and opposite so that no current passes in the circuit of these coils. If however, the core 19 is moved farther into the coil 17 the E. M. F. in this coil exceeds that in the coil 16 and a corresponding current passes in the circuit of these coils. As the magnetizing coil 21 is in circuit with the solenoid 5, the current therethrough is regulated substantially in inverse proportion to variations of the applied voltage, and the induced E. M. F.'s of the coils 16 and 17 are, therefore, also regulated in this inverse ratio. Thus the instruments 1 and 2 are responsive to the product of a current proportional to the applied voltage and a current regulated according to the value of the physical quantity, and also in substantially inverse ratio to variations of the applied voltage. It is thus evident that the instruments are responsive to the value of the physical quantity and are substantially unaffected by variations in the voltage. The winding or ring 20 is not always essential but may be employed to maintain the impedance of the coil 21 substantially constant for all positions of the core 19, the ring 20 being so proportioned and located that the decrease of the induced current therein as the core 19 is moved into the coil 17 is sufficient in its effect on the impedance of the coil 21 to balance the effect of the increased current induced in the coils 16 and 17.

The invention in the form described in Fig. 2 is very suitable for use in connection with the measurement of fluid flow, as the tube 18 may be made fluid-tight so that the core 19 may readily be operated by flow-responsive means subject to fluid pressure without any necessity for operating through stuffing-boxes and the like.

In the foregoing description it has been assumed that the phase angle between the currents in the sets of coils of the instruments 1 and 2 is maintained substantially constant, and this may readily be arranged. In certain cases, however, the circuits may be such that an increase in the impedance of the coil 5 also changes the phase angle between the currents in the two sets of instrument coils. When such is the case, a different adjustment of the core 6 and mechanism associated therewith may be necessary to ensure a minimum influence from changes in voltage, but no fundamental departure from the method of operation described is involved.

I claim:

1. An electrical system for measuring the values of physical quantities, comprising two electric circuits, an electrical instrument of the wattmeter type responsive to the product of the currents in said circuits, a source of voltage for supplying said circuits, means for varying the current in one of said circuits in accordance with the value of a physical quantity, and means for varying the current in the other of said circuits substantially inversely proportional to the variation in voltage in such manner that the combined influence of said currents on said instrument remains substantially constant on change of said voltage but varies on change of the value of said physical quantity.

2. An electrical system for measuring the values of physical quantities, comprising a main circuit, a secondary circuit, the current of said secondary circuit being allowed to vary in proportion to the voltage applied to said circuits and also being influenced by the value of a physical quantity, an electricial instrument of the wattmeter type coupled to said main and secondary circuits whose readings vary as the product of the currents in said main and secondary circuits, a solenoid in series with the main circuit, and a controlling means associated with the movable core of said solenoid to exert a supporting tension thereon, the arrangement being such that on increase in voltage the core moves into the solenoid against the tension of the said controlling means to increase the impedance thereof to an extent sufficient to decrease the current therethrough substantially in proportion to the increase in the voltage so that the readings of said instrument remain substantially unaffected by change in said voltage.

3. An electrical system for measuring the values of physical quantities, comprising a main circuit, a secondary circuit shunted across said main circuit, an electrical instrument of the wattmeter type coupled to said main and secondary circuits whose readings vary as the product of the currents in the main and secondary circuits, a solenoid provided with a movable core in series with the main circuit, and a controlling means associated with the movable core of said solenoid whose force opposing the electro-magnetic force exerted by the solenoid decreases as the core is pulled into the solenoid, the arrangement being such that, the current in the secondary circuit varies in proportion to the applied voltage, and that in the main circuit is regulated in substantially inverse proportion to variation of the applied voltage.

ALEXANDER GRESWOLDE SEYMOUR SANDISON.